United States Patent

Byker et al.

[11] Patent Number: 5,923,457
[45] Date of Patent: Jul. 13, 1999

[54] ELECTRO-OPTIC DEVICE INCLUDING A LOW SHEET RESISTANCE, HIGH TRANSMISSION TRANSPARENT ELECTRODE

[75] Inventors: Harlan J. Byker; Frederick T. Bauer; William L. Tonar, all of Holland, Mich.

[73] Assignee: Gentex Corporation, Zeeland, Mich.

[21] Appl. No.: 08/831,812

[22] Filed: Apr. 2, 1997

[51] Int. Cl.$^6$ ............................................. G02F 1/153
[52] U.S. Cl. .................... 359/271; 359/265; 359/268; 359/274
[58] Field of Search .................... 359/265–275; 427/166, 255.1–255.3; 428/432

[56] References Cited

U.S. PATENT DOCUMENTS

| | | | |
|---|---|---|---|
| 5,130,842 | 7/1992 | Gauthier et al. | 359/265 |
| 5,202,787 | 4/1993 | Byker et al. | 359/267 |
| 5,424,865 | 6/1995 | Lynam | 359/270 |
| 5,604,626 | 2/1997 | Teowee et al. | 359/265 |
| 5,668,663 | 9/1997 | Varaprasad et al. | 359/265 |
| 5,724,187 | 3/1998 | Varaprasad et al. | 359/265 |
| 5,729,379 | 3/1998 | Allemand et al. | 359/270 |

FOREIGN PATENT DOCUMENTS

WO 95/30495  11/1995  WIPO.

Primary Examiner—Georgia Epps
Assistant Examiner—Evelyn A. Lester
Attorney, Agent, or Firm—Brian J. Rees

[57] ABSTRACT

An improved electro-optic device for rearview mirror for motor vehicles and windows, the device incorporating a multi-layer transparent electrode having a first layer of tin-doped indium oxide and a second layer of fluorine-doped tin oxide. This multi-layer transparent conductive coating stack, which may also include additional coatings to provide color suppression, exhibits sheet resistances as low as about $10\Omega/\square$, while still being high in visible light transmission. This coating stack has surprising advantages for use in electro-optic devices. First, ITO base coat provides low sheet resistance and high light transmission, which is particularly valuable for large area electro-optic mirrors and windows, where resistance in the transparent coating limits speed and uniformity of coloration. Second, the FTO overcoat provides significant processing and environmental stability improvements as compared with ITO alone, and further allows the ITO/FTO stack to maintain low sheet resistance and high light transmission during and after the process steps used to make an electro-optic device.

24 Claims, 2 Drawing Sheets

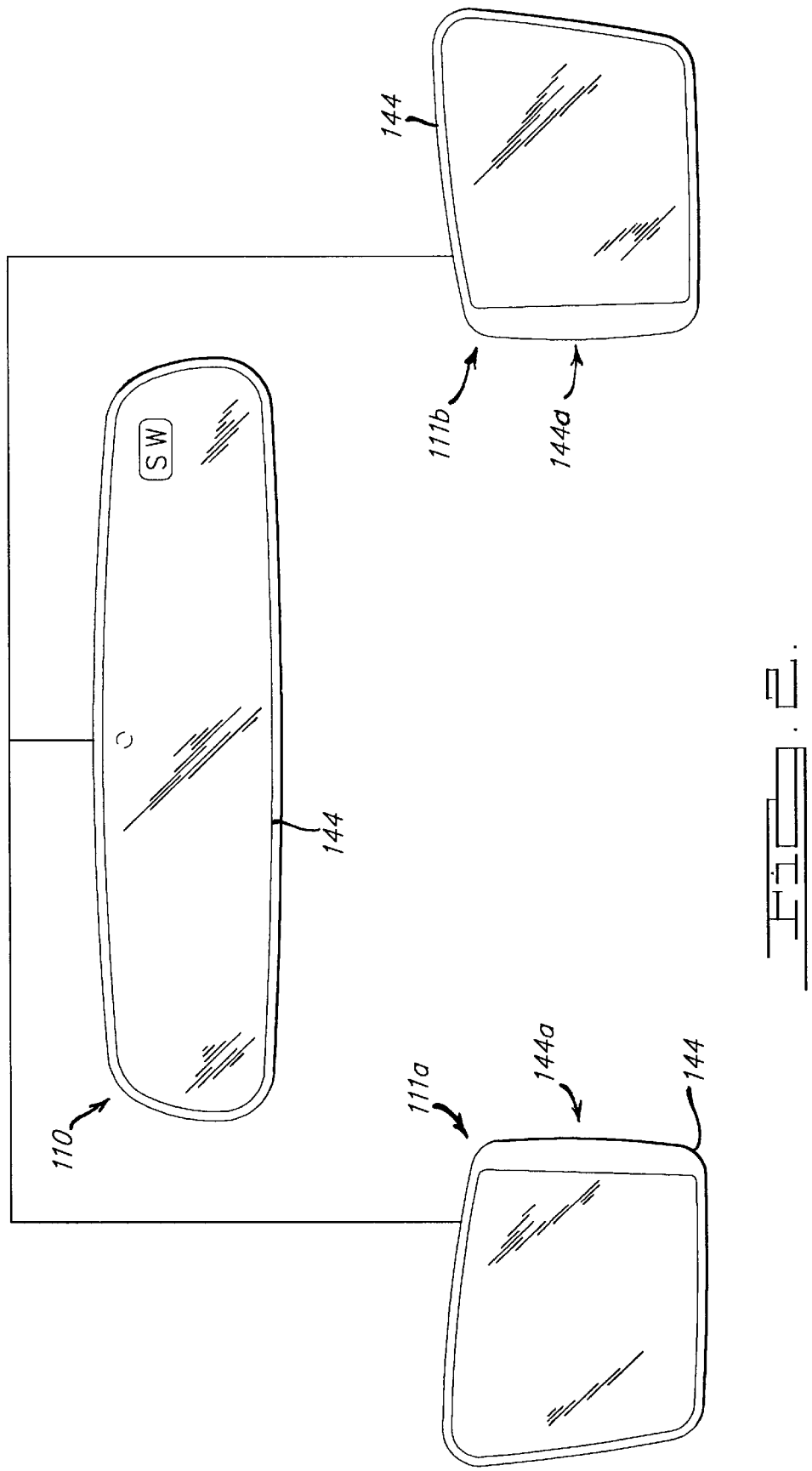

ELECTRO-OPTIC DEVICE INCLUDING A LOW SHEET RESISTANCE, HIGH TRANSMISSION TRANSPARENT ELECTRODE

BACKGROUND OF THE INVENTION

This invention relates to an improved electro-optic device having a low sheet resistance, high transmission transparent electrode and, more particularly, an improved electro-optic device having a multi-layer transparent electrode having a first layer of tin-doped indium oxide (ITO) and a second layer of fluorine-doped tin oxide (FTO). These electro-optic devices can be variable transmission windows or variable reflectance mirrors.

In electro-optic mirrors, when the electro-optic medium which functions as the media of variable transmittance is electrically controlled to darken, it begins to absorb light, and the more light the electro-optic layer absorbs the darker or lower in reflectance the mirror becomes. When the proper electrical voltage is applied, the mirror returns to its clear high reflectance state. For clarity of description of such a structure, the front surface of the front glass element is sometimes referred to as the first surface, and the inside surface of the front glass element is sometimes referred to as the second surface. The inside surface of the rear glass element is sometimes referred to as the third surface, and the back surface of the rear glass element is sometimes referred to as the fourth surface. The electro-optic medium is disposed in a sealed chamber defined by a transparent front glass element with a transparent conductive layer in contact with the electro-optic medium, a peripheral edge seal, and a rear mirror element having either a reflective layer or a transparent conductive layer in contact with the electro-optic medium (depending on whether the mirror has a third or fourth surface reflector). The conductive layers on both the front glass element and the rear glass element are connected to electronic circuitry which is effective to electrically energize the electro-optic medium to switch the mirror between nighttime and daytime reflectance modes, when glare is detected and when the glare subsides.

The electro-optic windows of the invention have similar construction and operation as the electro-optic mirrors of the invention except that the size or area can be much larger and a reflector layer is not needed.

The electro-optic medium of the present invention is typically comprised of electrochromic materials. In addition, electro-optic media such as photoelectrochromic, suspended particle and polymer dispersed liquid crystals can be used in the devices of the especially large area devices, are the speed with which the device colors and clears and the physical and environmental ruggedness of the device.

Presently the transparent conductive coatings used in electro-optic devices may be thin coatings of metals, such as gold and silver or doped metal oxides, such as fluorine-doped tin oxide, tin-doped indium oxide, aluminum-doped zinc oxide, etc., or they may be multi-layer coatings providing color suppression, such as TEC 20 or TEC 15, available from Libbey-Owens-Ford Co. (LOF) of Toledo, Ohio. These coatings have problems in that they are either relatively high in sheet resistance or if they are low in sheet resistance, they are expensive and/or low in visible light transmittance.

Consequently, it is desirable to provide an electro-optic device with a low sheet resistance, high transmission multi-layer transparent electrode having a first layer of tin-doped indium oxide and a second layer of fluorine-doped tin oxide, which is inexpensive to produce, durable and processible at high temperatures.

OBJECTS OF THE INVENTION

Accordingly, a primary object of the present invention is to provide an improved electro-optic device with a low sheet resistance, high transmission multi-layer transparent electrode having a first layer of tin-doped indium oxide and a second layer of fluorine-doped tin oxide.

Another object of the present invention is to provide an improved electro-optic device made from a transparent electrode that is hard, scratch resistant, forms strong bonds with adhesives, is not oxygen sensitive when heated to high temperatures, and can be bent to form convex or aspheric electro-optic mirror elements or heat tempered for window devices without adverse side effects.

SUMMARY OF THE INVENTION

The above and other objects, which will become apparent from the specification as a whole, including the drawings, are accomplished in accordance with the present invention by providing an electro-optic device containing a multi-layer transparent electrode having a first layer of tin-doped indium oxide and a second layer of fluorine-doped tin oxide. This multi-layer transparent conductive coating stack, which may also include additional coatings to provide color suppression, exhibits sheet resistances at least as low as about 10 $\Omega/\square$ and often as low as 4 $\Omega/\square$, while still being high in visible light transmission. The coatings are preferably applied to float glass by chemical vapor deposition processes during the float glass making process. This coating stack has surprising advantages for use in electro-optic devices. First, the ITO base coat provides low sheet resistance and high light transmission, which is particularly valuable for large area electro-optic mirrors and windows, where resistance in the transparent coating limits speed and uniformity of coloration. Second, the FTO over-coat provides significant processing and environmental stability improvements as compared with ITO alone, and further allows the ITO/FTO stack to maintain low sheet resistance and high light transmission during and after the process steps used to make an electro-optic device.

BRIEF DESCRIPTION OF THE DRAWINGS

The subject matter which is regarded as the invention is particularly pointed out and distinctly claimed in the concluding portion of the specification. The invention, together with further objects and advantages thereof, may best be understood by reference to the following description taken in connection with the accompanying drawings, where like numerals represent like components, in which:

FIG. 2 is a front elevational view schematically illustrating an inside/outside electro-optic rearview mirror system for motor vehicles where the inside and outside mirrors incorporate the multi-layer transparent electrode of the present invention.

DETAILED DESCRIPTION

Figure 1:
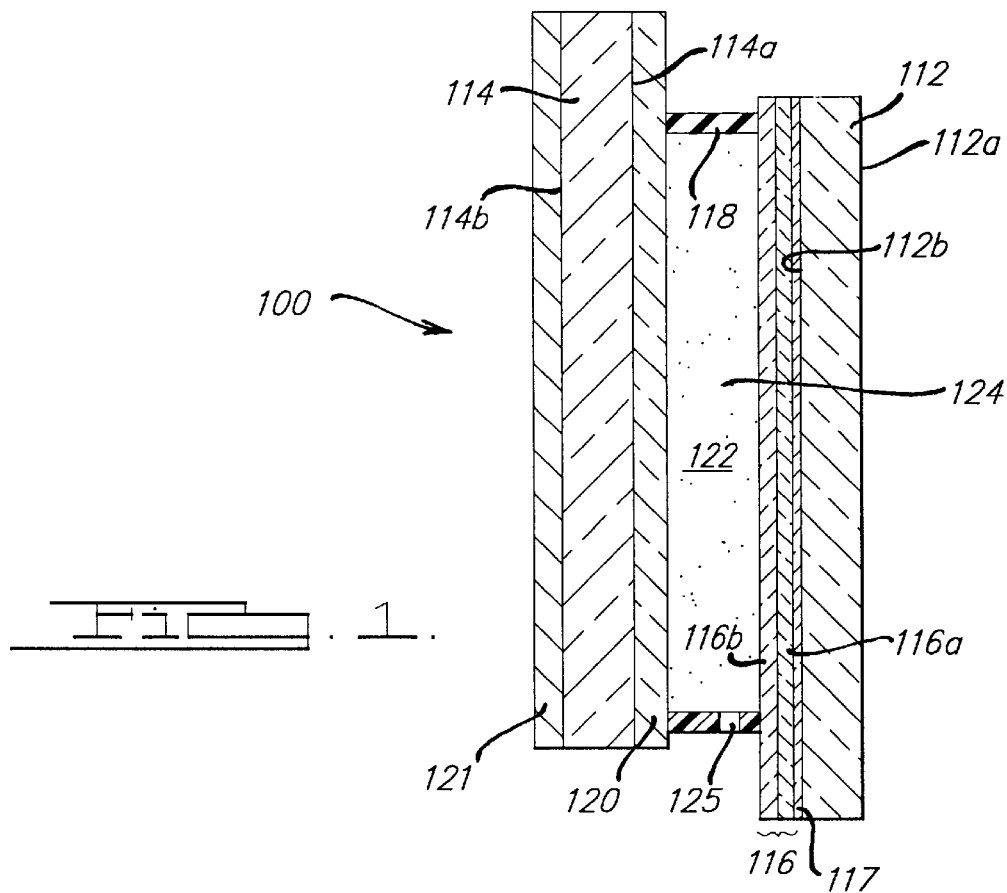
FIG. 1 is an enlarged cross-sectional view of an electro-optic device having a multi-layer transparent electrode having a first layer of tin-doped indium oxide and a second layer of fluorine-doped tin oxide.

FIG. 1 shows a cross-sectional view of an electro-optic device 100 which may be a mirror, a window, a display device and the like. Device 100 has a front transparent element 112 having a front surface 112a and a rear surface 112b, and a rear element 114 having a front surface 114a and a rear surface 114b. Since some of the layers of the device are very thin, the scale has been distorted for pictorial clarity. Also, for clarity of description of such a structure, the following designations will be used hereinafter. The front surface 112a of the front glass element will be referred to as the first surface and the back surface 112b of the front glass element as the second surface. The front surface 114a of the rear glass element will be referred to as the third surface, and the back surface 114b of the rear glass element as the fourth surface.

Front transparent element 112 may be any material which is transparent and has sufficient strength to be able to operate in the conditions, e.g., varying temperatures and pressures, commonly found in the automotive environment. Front element 112 may comprise any type of borosilicate glass, soda lime glass, float glass or any other material, such as, for example, a polymer or plastic, that is transparent in the visible region of the electromagnetic spectrum. Front element 112 is preferably a sheet of glass with a thickness ranging from 0.017 inches to about 0.4 inches. Rear element 114 must meet the operational conditions outlined above, except that if the electro-optic device 100 is a mirror, rear element 114 does not need to be transparent, and therefore may comprise polymers, metals, glass, ceramics, and preferably is a sheet of glass with a thickness ranging from 0.017 inches to about 0.4 inches. If the electro-optic device 100 is an automotive mirror, the front and rear elements are sometimes thinner than if the electro-optic devices is a window because windows are often larger than automotive mirrors and may need the added strength that a thicker transparent element will provide. In accordance with the present invention, a multi-layer coating of a transparent electrically conductive material 116 is deposited on the second surface 112b to act as an electrode. Another transparent electrode 120 may be deposited on the third surface 114a if the device 100 is a window or a mirror with a fourth surface reflector. The layers of transparent conductive material (116 and 120) generally must: be substantially transparent to visible light; bond well to front and rear elements (112 and 114) and seal means 118; be resistant to corrosion with any materials within the electro-optic device; be resistant to corrosion by the atmosphere; and have minimal diffuse or specular reflectance; high transmission; neutral coloration and good electrical conductance. One or both of the transparent conductors (116 and 120) may be multi-layer and include a base layer of tin-doped indium oxide (ITO) 116a and an over-coat layer of fluorine-doped tin oxide (FTO) 116b. This multi-layer transparent conductive coating stack exhibits sheet resistances at least as low as 10 $\Omega/\square$ and often as low as 4 $\Omega/\square$ while still having high visible light transmission.

This coating stack has surprising advantages for use in electro-optic devices. First, ITO base coat 116a provides low sheet resistance and high light transmission, which is particularly valuable for large area electro-optic mirrors and windows, where resistance in the transparent coating limits speed and uniformity of optical changes. Second, the FTO over-coat 116b provides significant processing and environmental ability improvements as compared with ITO alone, and further allows the ITO/FTO stack to maintain low sheet resistance and high light transmission during and after the process steps to produce an electro-optic device.

The processing and environmental stability improvements of the FTO over-coat provide for decreased production costs and significant improvements in the longevity of an electro-optic device during its lifetime. For example, FTO is harder and more scratch resistant than ITO alone, providing for ease of handling and washing of the coated glass during production. Since ITO is easier to scratch during production of electro-optic mirrors (and windows), it increases the amount of production scrap that must be discarded, and therefore the overall cost of production. The ITO and FTO multi-layer coating stack can be placed on the glass while the glass is being formed into sheet form on the float line (a glass-making process). Not only does this lead to coated glass with a lower cost per square foot, but it also provides for improved flatness of the coated glass as compared to some coating methods for glass that are performed off-line. Some offline coating methods using chemical vapor deposition or spray pyrolysis require the glass to be heated to high temperatures, e.g., 450–550° C. In off-line coating processes, heating to these high temperatures typically increases production costs and may induce warp in the coated glass, thereby causing problems in electro-optic devices such as mirrors, windows, displays, etc. For example, if one or both of the glass elements are warped, it will be very difficult to ensure that two glass elements, when placed together to form an electro-optic device, will be parallel. Significant double imaging problems can occur if the glass elements are not parallel and the thickness of the electro-optic medium will not be uniform. Another advantage that FTO provides is that adhesives, e.g., epoxies, often form stronger and more environmentally durable bonds to FTO coatings than to ITO coatings. Further, the FTO over-coating is not oxygen sensitive and protects the undercoating of ITO from oxygen even at temperatures where the glass can be bent to form the elements for convex or aspheric electro-optic mirror devices. ITO coatings alone, on the other hand, are sensitive to high temperature operations in the presence of oxygen or air, and can become significantly less conductive (higher sheet resistance) after the high temperature heat treatments required to perform glass bending operations.

Another important high temperature operation that is required for electro-optic devices that are to be used for windows is heat tempering. Tempering or strengthening of glass for use in windows is required for most windows that are to be installed near ground level, as part of a door and next to doors, certain skylight and atrium glass installations, and many security glazing situations. During the high temperature processing required for heat tempering, ITO coatings on glass become significantly less conductive. It has been discovered that a thin layer of FTO over the ITO stops substantial degradation of the ITO's high conductance or low sheet resistance even during and after heat tempering. The alternative is to heat temper or otherwise strengthen the glass prior to coating with transparent conductive layer in an off-line process with the attendant high cost and processing difficulties. This direct tempering of low cost, low sheet resistant, high visible light transmission transparent conductor coated glass is a significant discovery for all electro-optic windows, such as electrochromic, photoelectrochromic, suspended particle devices (i.e. dipolar suspension also known as SPD's), and polymer dispersed liquid crystals that are to be used in applications requiring shatter resistant glass.

In addition, the combination of heat tempered or otherwise strengthened transparent conductor coated glass with a free-standing gel or polymer matrix containing electrochromic medium, free-standing gel or polymer matrix containing photoelectrochromic medium, a gelled type SPD or a polymer dispersed liquid crystal that has a free-standing gel or polymer matrix like properties and bonds well to the transparent electrodes, provides remarkable safety characteristics for windows incorporating these electro-optic materials. In a shattering or attempted shattering situation, the free-standing gel or polymer matrix acts like a safety laminating layer which in the first place, (along with the strengthening of the glass) helps prevent shattering by causing the energy of a blow to the window to be dissipated, throughout the window structure including both sheets of glass. In the second place, if one sheet of glass breaks or shatters, the strengthening process results in a break pattern in which small pieces are formed and the free-standing gel or polymer matrix tends to hold the pieces in place next to the unshattered sheet of glass. And in the third place, if both sheets of glass shatter, both will break into small pieces if both are strengthened and the free-standing gel or polymer matrix will prevent or retard the scattering of the glass pieces.

Thus, an ITO/FTO coating stack, deposited on the glass during float line glassmaking process (with the possible color suppressing undercoating(s) 117) has the advantages of low sheet resistance with high light transmission (as compared to FTO alone), and yet has the processing advantages provided by FTO, while still being able to be made on the glass-making float line. This ITO/FTO stack was developed by Libbey-Owens-Ford Co. (LOF) of Toledo, Ohio. These color suppression coating(s) 117 may comprise a first thin layer of doped or undoped tin oxide, or doped or undoped fluorine oxide, and a second thin layer of silicon dioxide as discussed in co-filed U.S. patent application entitled "AN ELECTROCHROMIC MIRROR WITH TWO THIN GLASS ELEMENTS AND A GELLED ELECTROCHROMIC MEDIUM" the entire disclosure of which in hereby incorporated herein by reference.

For electro-optic mirrors, the reflector 121 may be placed on the fourth surface 114b, in which case a layer of a transparent conductive material 120 is disposed on the third surface 114a, or the reflector may be placed on the third surface 114a in accordance with the disclosure of U.S. patent application entitled, "ELECTROCHROMIC REARVIEW MIRROR INCORPORATING A THIRD SURFACE METAL REFLECTOR," filed on or about Apr. 2, 1997. The entire disclosure of this commonly assigned, co-filed U.S. patent application is hereby incorporated herein by reference. In this case the third surface reflector doubles as an electrode and the transparent conductive layer on this surface is not necessary. Further, if the reflector is placed on the third surface 114a, a heater (not shown) may be placed directly on the fourth surface 114b in accordance with the teachings in the immediately above-referenced U.S. patent application.

The coating 120 of the third surface 114a (whether a transparent conductor or a reflector/electrode) is sealably bonded to the coating 116 on the second surface 112b near the outer perimeter by a sealing member 118, thereby defining a chamber 122. For electro-optic mirrors, sealing member 118 preferably contains glass beads (not shown) to hold transparent elements 112 and 114 in a parallel and spaced-apart relationship.

Sealing member 118 may be any material which is capable of adhesively bonding the coatings on the second surface 112b to the coatings on the third surface 114a to seal the perimeter such that electro-optic medium 124 does not leak from chamber 122. Sealing member 118 should also be generally inert to any component of the electro-optic medium 124 disposed in chamber 122. Optionally, the layer of transparent conductive coating 116 and the layer on the third surface 120 (transparent conductive material or reflector/electrode) may be removed over a portion where sealing member 118 is disposed (not the entire portion, otherwise the voltage or drive potential could not be applied to the two coatings). In such a case, sealing member 118 must bond well to glass.

The performance requirements for a perimeter seal member 118 used in electro-optic devices are similar to those for a perimeter seal used in a liquid crystal device (LCD) which are well known in the art. The seal must have good adhesion to glass, metals and metal oxides, must have low permeabilities for oxygen, moisture vapor and other detrimental vapors and gases, and must not interact with or poison the electrochromic or liquid crystal material it is meant to contain and protect. The perimeter seal can be applied by means commonly used in the LCD industry such as by silk-screening or dispensing. Totally hermetic seals such as those made with glass frit or solder glass can be used, but the high temperatures involved in processing (usually near 450-degrees Centigrade) this type of seal can cause numerous problems such as glass substrate warpage, changes in the properties of transparent conductive electrode and oxidation or degradation of the reflector. Because of their lower processing temperatures, thermoplastic, thermosetting or UV curing organic sealing resins are preferred. Such organic resin sealing systems for LCD's are described in U.S. Pat. Nos. 4,297,401, 4,418,102, 4,695,490, 5,596,023 and 5,596,024. Because of their excellent adhesion to glass, low oxygen permeability and good solvent resistance, epoxy based organic sealing resins are preferred. These epoxy resin seals may be UV curing, such as described in U.S. Pat. No. 4,297,401, or thermally curing, such as with mixtures of liquid epoxy resin with liquid polyamide resin or dicyandiamide, or they can be homopolymerized. The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures mono-functional, di-functional and multi-functional epoxy resins and curing agents. Additives such as silanes or titanates can be used to improve the seal's hydrolytic stability, and spacers such as glass beads or rods can be used to control final seal thickness and substrate spacing. Suitable epoxy resins for use in a perimeter seal member 118 include but are not limited to: "EPON RESIN" 813, 825, 826, 828, 830, 834, 862, 1001F, 1002F, 2012, DPS-155, 164, 1031, 1074, 58005, 58006, 58034, 58901, 871, 872 and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510 and PT 810 available from Ciba Geigy, Hawthorne, N.Y.; "D.E.R." 331, 317, 361, 383, 661, 662, 667, 732, 736, "D.E.N." 431, 438, 439 and 444 available from Dow Chemical Co., Midland, Mich. Suitable epoxy curing agents include V-15, V-25 and V-40 polyamides from Shell Chemical Co.; "AJICURE" PN-23, PN-34 and VDH available from Ajinomoto Co., Tokyo, Japan; "CUREZOL" AMZ, 2MZ, 2E4MZ, C11Z, C17Z, 2PZ, 2IZ and 2P4MZ available from Shikoku Fine Chemicals, Tokyo, Japan; "ERISYS" DDA or DDA accelerated with U-405, 24EMI, U-410 and U-415 available from CVC Specialty Chemicals, Maple Shade, N.J.; "AMICURE" PACM, 352, CG, CG-325 and CG-1200 available from Air Products, Allentown, Pa. Suitable fillers include fumed silica such as "CAB-O-SIL"

L-90, LM-130, LM-5, PTG, M-5, MS-7, MS-55, TS-720, HS-5, EH-5 available from Cabot Corporation, Tuscola, Ill.; "AEROSIL" R972, R974, R805, R812, R812 S, R202, US204 and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, TRANSLINK 555 available from Engelhard Corporation, Edison, N.J. Suitable silica fillers are SILCRON G-130, G-300, G-100-T and G-100 available from SCM Chemicals, Baltimore, Md. Suitable silane coupling agents to improve the seal's hydrolytic stability are Z-6020, Z-6030, Z-6032, Z-6040, Z-6075 and Z-6076 available from Dow Corning Corporation, Midland, Mich. Suitable precision glass microbead spacers are available in an assortment of sizes from Duke Scientific, Palo Alto, Calif.

Electro-optic media 124 comprises a wide variety of materials capable of changing properties such that light traveling therethrough is scattered, absorbed or otherwise attenuated. Such media, include solution-phase electrochromic materials, surface-confined electrochromic materials, and electro deposition type electrochromic materials. Preferred electrochromic media are solution-phase redox electrochromic materials, such as those disclosed in U.S. Pat. Nos. 4,902,108; 5,128,799; 5,278,693; 5,280,380; 5,282,077; 5,294,376; and 5,336,448. Electro-optic media 124 may also comprise dipolar suspension or suspended particle media such as these disclosed in U.S. Pat. Nos. 4,877,313; 5,002,701; 5,463,491; and 5,463,492; photoelectrochromic (or photochromic) media such as those disclosed in U.S. Pat. No. 5,604,626; polymer dispersed liquid crystal media such as those disclosed in U.S. Pat. Nos. 4,435,047; 5,082,351; 5,089,904; 5,530,566; 5,585,035; and 5,593,615. The disclosures of all of these U.S. patents are hereby incorporated in their entirety herein by reference. The electro-optic media may also comprise other materials like light absorbers, light stabilizers, thermal stabilizers, antioxidants thickeners and a polymer matrix.

With respect to vehicular mirrors, FIG. 2 shows a front elevational view schematically illustrating an inside mirror assembly 110 and two outside rearview mirror assemblies 111a and 111b for the driver-side and passenger-side, respectively, all of which are adapted to be installed on a motor vehicle in a conventional manner and where the mirrors face the rear of the vehicle and can be viewed by the driver of the vehicle to provide a rearward view. Inside mirror assembly 110, and outside rearview mirror assemblies 111a and 111b may incorporate light-sensing electronic circuitry of the type illustrated and described in the Canadian Patent No. 1,300,945; U.S. Pat. No. 5,204,778; or U.S. Pat. No. 5,451,822, and other circuits capable of sensing glare and ambient light and supplying a drive voltage to the electro-optic element. Mirror assemblies 110, 111a and 111b are essentially identical in that like numbers identify components of the inside and outside mirrors. These components may be slightly different in configuration but function in substantially the same manner and obtain substantially the same results as similarly numbered components. For example, the shape of the front glass element of inside mirror 110 is generally longer and narrower than outside mirrors 111a and 111b. There are also some different performance standards placed on inside mirror 110 compared with outside mirrors 111a and 111b. For example, inside mirror 110 generally, when fully cleared, should have a reflectance value of about 70 percent to about 80 percent or higher whereas the outside mirrors often have a reflectance of about 50 percent to about 65 percent. Also, in the United States (as supplied by the automobile manufacturers), the passenger-side mirror 111b typically has a spherically bent, or convex shape, whereas the driver-side mirror 111a, and inside mirror 110 presently must be flat. In Europe, the driver-side mirror 111a is commonly flat or aspheric, whereas the passenger-side mirror 111b has a convex shape. In Japan, both outside mirrors have a convex shape.

Rearview mirrors embodying the present invention preferably include a bezel 144, which extends around the entire periphery of each individual assembly 110, 111a and/or 111b. The bezel 144 conceals and protects the contact means or spring clips (not shown) and the peripheral edge portions of sealing member and both the front and rear glass elements (described below). A wide variety of bezel designs are well known in the art, such as, for example the bezel disclosed in above-referenced U.S. Pat. No. 5,448,397. There are also a wide variety of housing well known in the art for attaching the mirror assembly 110 to the inside front windshield of an automobile, or for attaching the mirror assemblies 111a and 111b to the outside of an automobile. A preferred housing for attaching an inside assembly is disclosed in above-referenced U.S. Pat. No. 5,337,948.

Figure 3:
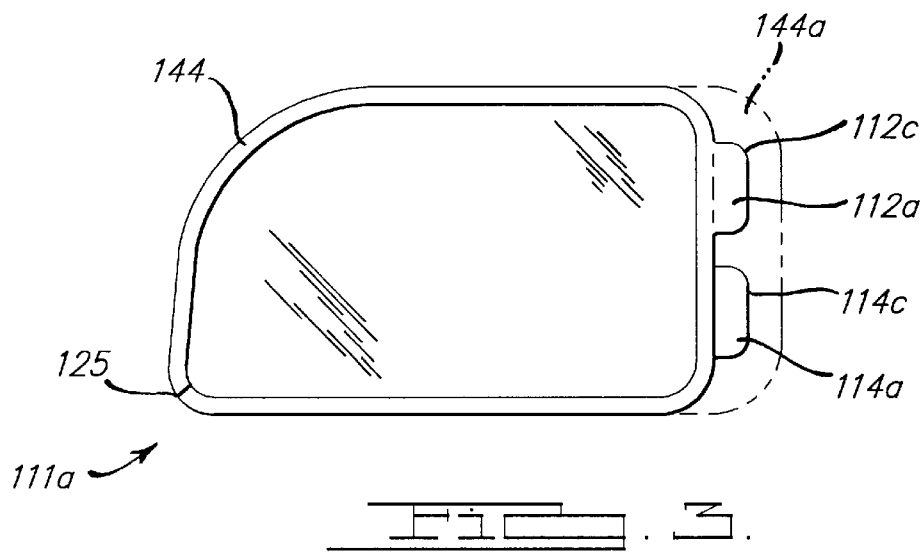
FIG. 3 is a front elevational view schematically illustrating an outside electro-optic rearview mirror for motor vehicles having in-board tab portions designed for improved interconnection between the electronics and the electrodes that are in contact with the electrochromic medium.

In accordance with another aspect of the present invention, mirror assemblies 111a and 111b may have a thicker bezel in the in-board region 144a (i.e., closest to the automobile) while allowing a thinner bezel on the remaining three sides of the bezel 144. The thinner bezel on the remaining three sides would improve the appearance of the mirror, and the thicker bezel on the in-board region 144a would not detract from the appearance of the mirror because the angle of observation tends to decrease the perceived size of this in-board portion 144a. Referring now to FIG. 3, the two transparent elements 112 and 114 may be aligned with zero offset and have tab portions (112c and 114c, respectively) for point contact from the conductive materials on the second and third surfaces (116 and 120). The plug that is used to inhibit the electro-optic medium from leaking from chamber through the fill port 125 could be placed on the outer portion of the mirror so that it is covered by the corner radius of the bezel 144. The drive potential for the ITO/FTO transparent conductor disposed on the second surface 112b would be contacted at tap portion 112c using contact means such as spring clips well know in the art. The drive potential for either transparent conductor or reflector/electrode (depending on whether the mirror has a fourth surface or third surface reflector) would be input by contact at tab portion 114c again using standard clips. Each clip could be made much shorter due to the higher conductance of either or both the ITO/FTO transparent conductor and the reflector/electrode.

While the invention has been described in detail herein in accordance with certain preferred embodiments thereof, many modifications and changes therein may be effected by those skilled in the art without departing from the spirit of the invention. Accordingly, it is our intent to be limited only by the scope of the appending claims and not by way of the details and instrumentalities describing the embodiments shown herein.

What is claimed is:

1. An electro-optic device, comprising:
   front and rear spaced elements each having front and rear surfaces;
   a layer of a multi-layer transparent conductive material disposed on said rear surface of said front element and said front surface of said rear element, said layer including a base layer of a tin-doped indium oxide and an over-coat layer of a fluorine-doped tin oxide; and a sealing member sealably bonding together said front and rear spaced elements in a spaced-apart relationship to define a chamber therebetween, said chamber containing an electro-optic medium.

2. The electro-optic device of claim 1, wherein said electro-optic medium is selected from group consisting of: electrochromic, dipolar suspension, suspended particle, photoelectrochromic, and polymer dispersed liquid crystal.

3. The electro-optic device of claim 2, wherein said electro-optic medium is an electrochromic medium in which the electrochromic materials are selected from the group consisting of: solution-phase, surface-confined, and electrodeposition.

4. The electro-optic device of claim 1, wherein said multi-layer transparent conductive material has a sheet resistance of ten ohms per square or less.

5. The electro-optic device of claim 1, wherein said multi-layer transparent conductive material has high transmission to visible light.

6. The electro-optic device of claim 1, wherein said multi-layer transparent conductive material is scratch resistant.

7. The electro-optic device of claim 1, wherein said multi-layer transparent conductive material is not oxygen sensitive.

8. The electro-optic device of claim 1, wherein said front element is tempered glass.

9. The electro-optic device of claim 8, wherein said rear element is tempered glass.

10. The electro-optic device of claim 1, wherein said rear element is tempered glass.

11. The electro-optic device of claim 1, further comprising a color suppressing material disposed between said base coat and said front element.

12. An electro-optic variable reflectance mirror for automotive vehicles, comprising:

front and rear spaced elements each having front and rear surfaces;

a layer of a multi-layer transparent conductive material disposed on said rear surface of said front element, said layer including a base layer of a tin-doped indium oxide and an over-coat layer of a fluorine-doped tin oxide;

a reflector disposed on one side of said rear element provided that, if said reflector is on said rear surface of said rear element, then said front surface of said rear element contains a layer of a transparent conductive material; and a sealing member sealably bonding together said front and rear spaced elements in a spaced-apart relationship to define a chamber therebetween said chamber containing an electro-optic medium.

13. The electro-optic mirror of claim 12, wherein said electro-optic medium is selected from group consisting of: electrochromic, dipolar suspension, suspended particle, photoelectrochromic, and polymer dispersed liquid crystal.

14. The electro-optic mirror of claim 13, wherein said electro-optic medium is an electrochromic medium in which the electrochromic materials are selected from the group consisting of: solution-phase, surface-confined, and electrodeposition.

15. The electro-optic mirror of claim 12, wherein said multi-layer transparent conductive material has a sheet resistance of ten ohms per square or less.

16. The electro-optic mirror of claim 12, wherein said multi-layer transparent conductive material has high transmission to visible light.

17. The electro-optic mirror of claim 12, wherein said multi-layer transparent conductive material is scratch resistant.

18. The electro-optic mirror of claim 12, wherein said multi-layer transparent conductive material is not oxygen sensitive.

19. The electro-optic mirror of claim 12, wherein said each of front and said rear elements are tempered glass.

20. The electro-optic mirror of claim 12, where, if said reflector is disposed on said rear surface of said rear element, another layer of a multi-layer transparent conductive material is disposed on said front surface of said rear element, said another layer including a base layer of a tin-doped indium oxide and an over-coat layer of a fluorine-doped tin oxide.

21. The electro-optic mirror of claim 12, further comprising a color suppressing material disposed between said base coat and said front element.

22. The electro-optic mirror of claim 12, where said front and rear elements are bent.

23. The electro-optic mirror of claim 22, where said front and rear elements are bent in an aspheric or convex shape.

24. An electro-optic device comprising:

front and rear spaced elements each having front and rear surfaces;

at least one layer of a multi-layer transparent conductive material disposed on at least one of said rear surface of said front element and said front surface of said rear element, said at least one multi-layer transparent conductive material including a base layer of a tin-doped indium oxide and an overcoat of a fluorine-doped tin oxide; and a sealing member sealably bonding together said front and rear spaced element in a spaced apart relationship to define a chamber there between, said chamber containing an electro-optic medium.

* * * * *